United States Patent
Wen

(10) Patent No.: US 11,778,510 B2
(45) Date of Patent: Oct. 3, 2023

(54) COMMUNICATION CONTROL APPARATUS AND COMMUNICATION CONTROL METHOD

(71) Applicant: FUJITSU LIMITED, Kawasaki (JP)

(72) Inventor: Yun Wen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 17/521,916

(22) Filed: Nov. 9, 2021

(65) Prior Publication Data

US 2022/0272574 A1    Aug. 25, 2022

(30) Foreign Application Priority Data

Feb. 19, 2021    (JP) .................................. 2021-025145

(51) Int. Cl.
| | |
|---|---|
| *H04W 28/086* | (2023.01) |
| *H04W 28/20* | (2009.01) |
| *H04W 28/22* | (2009.01) |

(52) U.S. Cl.
CPC ....... *H04W 28/0862* (2023.05); *H04W 28/20* (2013.01); *H04W 28/22* (2013.01)

(58) Field of Classification Search
CPC . H04W 28/0862; H04W 28/18; H04W 28/20; H04W 28/22
See application file for complete search history.

(56) References Cited

U.S. PATENT DOCUMENTS

| | | | |
|---|---|---|---|
| 2017/0272956 A1* | 9/2017 | Gu | H04W 16/10 |
| 2017/0318472 A1* | 11/2017 | Yu | H04W 16/10 |
| 2019/0223025 A1* | 7/2019 | Kakinada | H04W 72/0453 |

FOREIGN PATENT DOCUMENTS

| | | |
|---|---|---|
| JP | H10-042037 A | 2/1998 |
| JP | 2016-111637 A | 6/2016 |

* cited by examiner

*Primary Examiner* — Khoa Huynh
(74) *Attorney, Agent, or Firm* — Fujitsu Patent Center

(57) ABSTRACT

A communication control apparatus allocates capacity of a line that connects a plurality of baseband units managed by a plurality of operators to a radio unit shared by the plurality of operators to the plurality of operators. The communication control apparatus includes a memory and a processor coupled to the memory. The processor executes a process including: calculating a fairness coefficient indicating allocation fairness of the line with respect to each of the plurality of operators; acquiring needed capacity of the line needed by each of the plurality of operators and a gain achievable when the needed capacity is allocated to each of the plurality of operators; and deciding allocation capacity of the line for each operator based on the fairness coefficient, the needed capacity, and the gain.

9 Claims, 8 Drawing Sheets

FIG.4

| UE IDENTIFICATION INFORMATION | GENERATED TRAFFIC AMOUNT (Mbps) | UNIT BAND COMMUNICATION RATE (bps/Hz) | CONNECTION SHARED RU IDENTIFICATION INFORMATION |
|---|---|---|---|
| UE#1 | 100 | 1.5 | RU#1 |
| ... | ... | ... | ... |
| UE#n | 10 | 2 | RU#4 |

COMMUNICATION CONTROL APPARATUS AND COMMUNICATION CONTROL METHOD

CROSS-REFERENCE TO RELATED APPLICATION

This application is based upon and claims the benefit of priority of the prior Japanese Patent Application No. 2021-025145, filed on Feb. 19, 2021, the entire contents of which are incorporated herein by reference.

FIELD

The embodiments discussed herein are related to a communication control apparatus and a communication control method.

BACKGROUND

In recent years, in wireless communication systems, services using the fifth generation mobile communication (5G) capable of performing high-speed and large-capacity data communication are being introduced. In services using 5G, for example, radio waves, such as millimeter waves, having frequencies higher than those used in Long Term Evolution (LTE) or the like are used. The radio waves at such high frequencies have straightness characteristics and are less likely to pass through shielding objects, so that a radius of a cell tends to be small. Consequently, in order to construct wireless communication systems, there is a need to install base station apparatuses at high densities.

Specifically, base station apparatuses are split into, for example, baseband units (i.e., central units/distributed units: CUs/DUs) that perform a baseband process and radio units (RUs) that perform a radio process; therefore, the RUs having antennas are disposed at high densities. Accordingly, telecommunications carriers (i.e., mobile network operators: MNOs) that construct wireless communication systems are able to efficiently expand communication areas and system capacity by installing RUs that can be shared in cooperation with other MNOs.

Patent Document 1: Japanese Laid-open Patent Publication No. H10-042037
Patent Document 2: Japanese Laid-open Patent Publication No. 2016-111637

Incidentally, if a RU (hereinafter, referred to as a "shared RU") that is shared by a plurality of MNOs is installed, a front-haul (FH) line that connects the CUs/DUs and the shared RU is also shared by the plurality of MNOs. However, capacity of the FH line (hereinafter, referred to as "FH capacity") is limited; therefore, there is a problem in that it is difficult for each of the plurality of MNOs to ensure needed and sufficient FH capacity.

Specifically, for example, if a dedicated RU for each MNO is substituted for the shared RU, it is difficult to simultaneously install additional FH lines in accordance with the number of MNOs that use the shared RU, and the FH capacity is not sufficiently increased even if the plurality of MNOs use the shared RU. Consequently, it is conceivable to fairly allocate the FH capacity to the plurality of MNOs that use the shared RU by, for example, equally dividing the FH capacity.

However, if the FH capacity is equally divided and allocated, there may be a case in which, for example, regarding a certain MNO, a traffic amount is smaller than the allocated FH capacity and thus surplus FH capacity is generated, whereas, regarding the other MNOs, a traffic amount is larger than the allocated FH capacity and thus insufficient FH capacity is generated. As a result, communication efficiency is degraded and throughput of the entire system is accordingly decreased. In this way, it is difficult to efficiently allocate FH capacity to the plurality of MNOs while guaranteeing fairness.

SUMMARY

According to an aspect of an embodiment, a communication control apparatus allocates capacity of a line that connects a plurality of baseband units managed by a plurality of operators to a radio unit shared by the plurality of operators to the plurality of operators. The communication control apparatus includes a memory and a processor coupled to the memory. The processor executes a process including: calculating a fairness coefficient indicating allocation fairness of the line with respect to each of the plurality of operators; acquiring needed capacity of the line needed by each of the plurality of operators and a gain achievable when the needed capacity is allocated to each of the plurality of operators; and deciding allocation capacity of the line for each operator based on the fairness coefficient, the needed capacity, and the gain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a specific example of UE information.

DESCRIPTION OF EMBODIMENTS

Preferred embodiments of the present invention will be explained with reference to accompanying drawings. The present invention is not limited to the embodiments.

[a] First Embodiment

Figure 1:
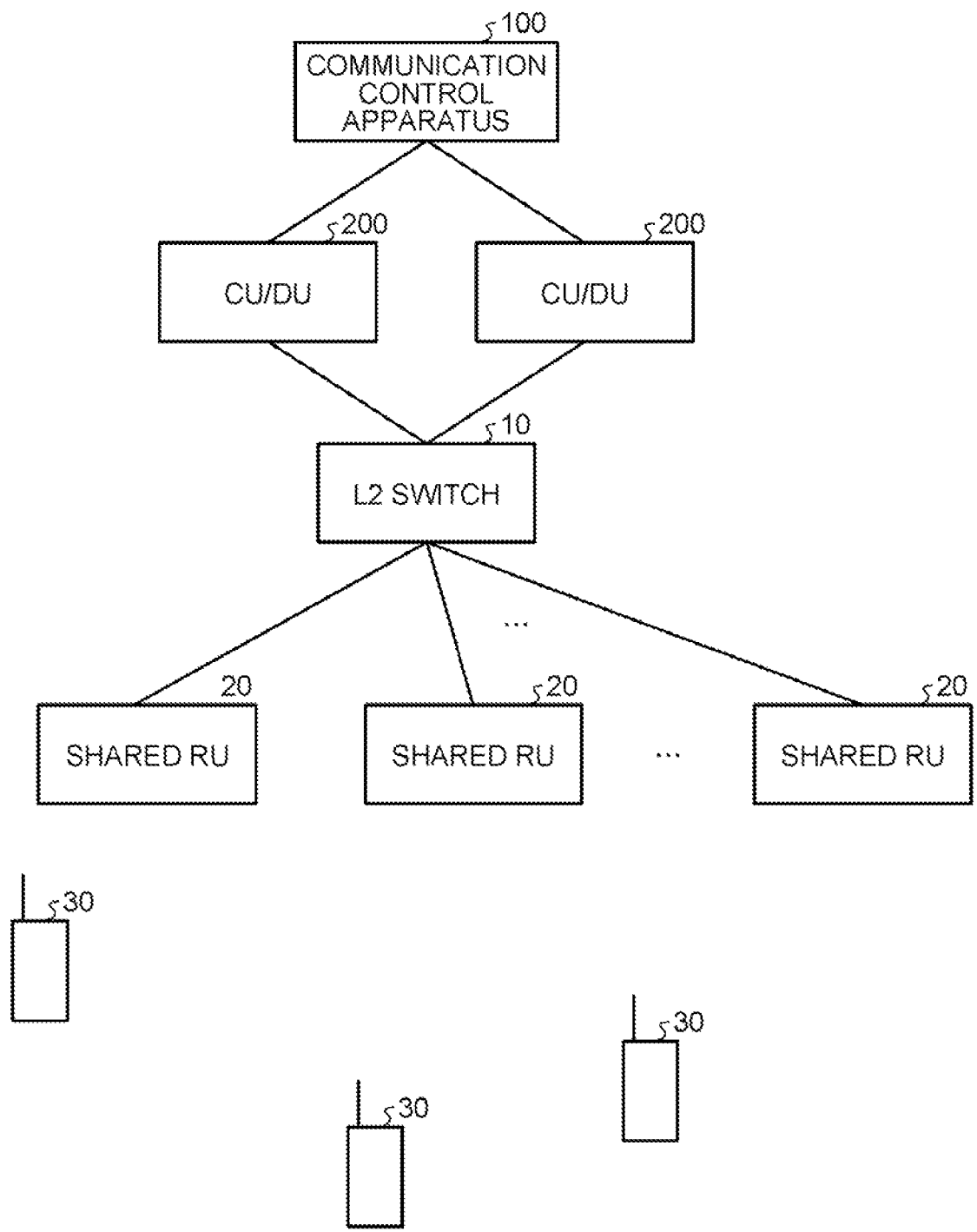
FIG. 1 is a diagram illustrating a configuration example of a wireless communication system.

FIG. 1 is a configuration example of a wireless communication system according to a first embodiment. In the wireless communication system illustrated in FIG. 1, a plurality of CU/DUs 200 that are managed different MNOs share a plurality of shared RUs 20. Namely, the plurality of CU/DUs 200 are connected to the plurality of shared RUs 20 via a L2 switch 10. A line that connects each of the CU/DUs 200 to the shared RUs 20 is a front-haul line (FH line). Furthermore, the plurality of CU/DUs 200 are connected to a communication control apparatus 100 that is used in common.

The communication control apparatus 100 is called, for example, a RAN Intelligent Controller (RIC) and controls a base station. The communication control apparatus 100 controls the CU/DUs 200 that are baseband units constituting a base station. Specifically, the communication control apparatus 100 allocates capacity of a FH line (FH capacity) to each of the plurality of CU/DUs 200 managed by different MNOs. Namely, the communication control apparatus 100 decides distribution of the FH capacity with respect to each MNO for each of the shared RUs 20 and notifies the CU/DUs 200 managed by the respective MNOs of the FH capacity for each MNO in each of the shared RUs 20. The communication control apparatus 100 acquires MNO information on each MNO from the CU/DUs 200 and decides, on the basis of the acquired MNO information and an allocation track record of past FH capacity with respect to each MNO, distribution of the FH capacity with respect to each MNO for each of the shared RUs 20. A configuration and an operation of the communication control apparatus 100 in detail will be described later in detail.

The CU/DUs 200 are baseband units constituting a base station. The CU/DUs 200 connect to a core network (not illustrated) disposed for each MNO and perform a baseband process on data for each MNO. Furthermore, the CU/DUs 200 acquire information on user equipments (UEs) 30 that are connected to the plurality of shared RUs 20 via the FH lines, that perform wireless communication with each of the shared RUs 20, and that are managed by the own MNO. Then, the CU/DUs 200 generate MNO information related to the respective own MNOs from the acquired UE information and outputs the MNO information to the communication control apparatus 100.

Furthermore, if the FH capacity for each of the shared RUs 20 is allocated by the communication control apparatus 100, the CU/DUs 200 perform scheduling of the allocated FH capacity, and then, transmit and receive data to and from the shared RUs 20 via the FH line. A configuration and an operation of the CU/DU 200 in detail will be described later in detail.

The L2 switch 10 is provided in the FH line and connects the plurality of CU/DUs 200 and the plurality of shared RUs 20.

The shared RUs 20 are radio units constituting a base station. The shared RUs 20 connect to the plurality of CU/DUs 200 associated with the plurality of respective MNOs and perform a radio process on the data. Namely, the shared RUs 20 wirelessly transmit and receive data to and from the UEs 30 included in a cell.

The UEs 30 are terminal devices capable of performing wireless communication. The UEs 30 perform wireless communication with the shared RUs 20 that form a cell in which the own devices are present. The UEs 30 are under the jurisdiction of one of the plurality of MNOs that shares the shared RU 20 and transmit and receive data to and from the CU/DU 200 associated with the subject MNO.

Figure 2:
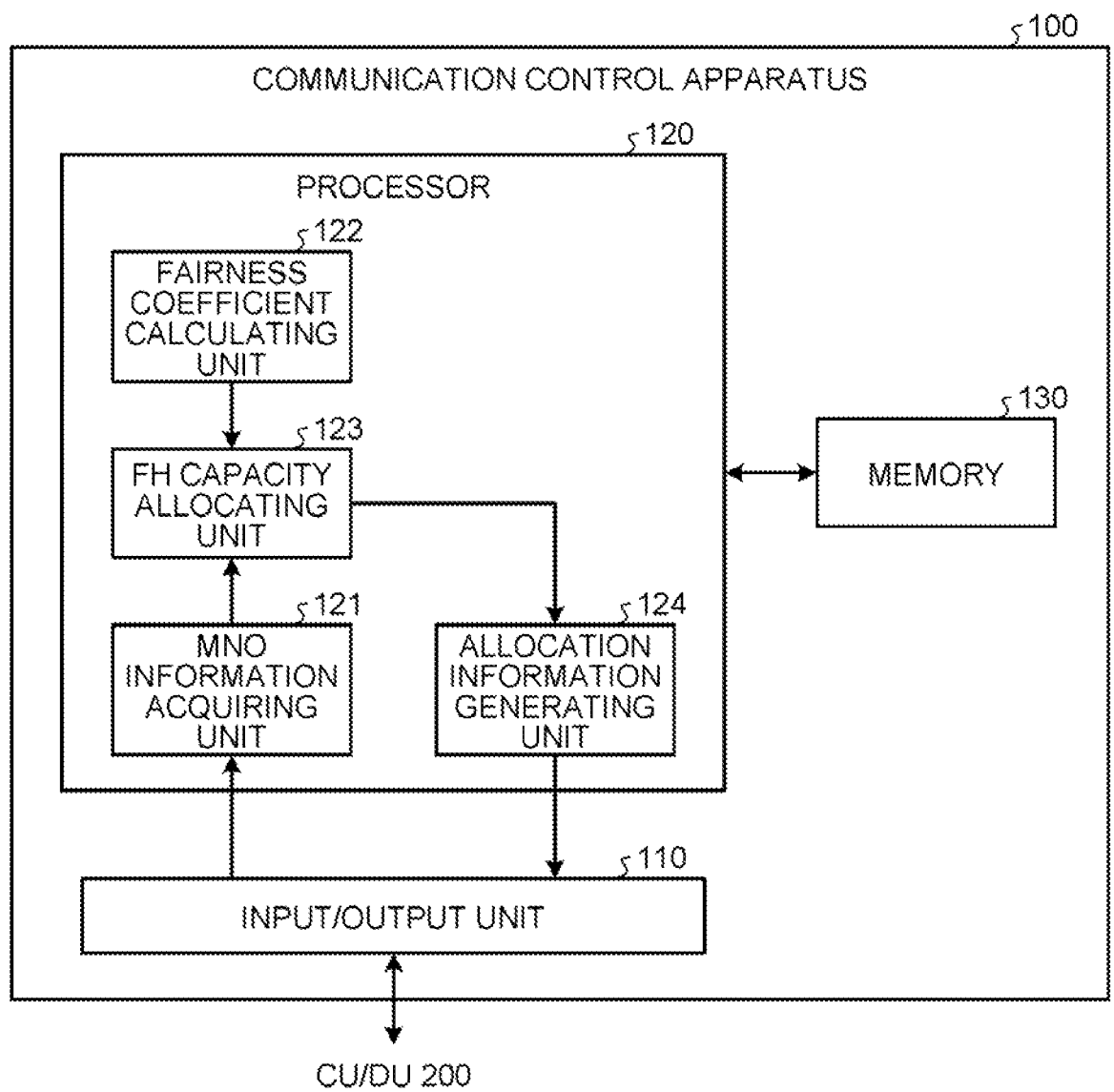
FIG. 2 is a block diagram illustrating a configuration of a communication control apparatus according to a first embodiment.

FIG. 2 is a block diagram illustrating a configuration of the communication control apparatus 100 according to the first embodiment. The communication control apparatus 100 illustrated in FIG. 2 includes an input/output unit 110, a processor 120, and a memory 130.

The input/output unit 110 connects to the plurality of CU/DUs 200, receives an input of information from the CU/DU 200, and outputs the information to the CU/DUs 200. Specifically, the input/output unit 110 receives, from each of the CU/DUs 200, an input of MNO information related to the MNO that manages each of the CU/DUs 200. Furthermore, the input/output unit 110 outputs allocation information for notifying each of the CU/DUs 200 of the allocated FH capacity.

The processor 120 includes, for example, a central processing unit (CPU), a field programmable gate array (FPGA), a digital signal processor (DSP), or the like and performs overall control of the communication control apparatus 100. Specifically, the processor 120 includes a MNO information acquiring unit 121, a fairness coefficient calculating unit 122, a FH capacity allocating unit 123, and an allocation information generating unit 124.

The MNO information acquiring unit 121 acquires the MNO information on an input that is received by the input/output unit 110. The MNO information includes information on the FH capacity needed by each MNO in each of the shared RUs 20 (hereinafter, referred to as "needed capacity") and information on a gain that indicates a transmission traffic amount at the time at which the needed capacity is allocated to each MNO. The MNO information acquiring unit 121 notifies the FH capacity allocating unit 123 of the needed capacity and the gain included in the acquired MNO information.

The fairness coefficient calculating unit 122 calculates a fairness coefficient of each MNO on the basis of the allocation track record of the past FH capacity with respect to each of the plurality of MNOs. Specifically, the fairness coefficient calculating unit 122 sums, for each MNO, the FH capacity allocated to each MNO in, for example, a past predetermined time period and calculates a reciprocal of the total value of the MNOs as a fairness coefficient. Therefore, the fairness coefficient calculating unit 122 calculates a smaller fairness coefficient with respect to the MNO in which a larger FH capacity was allocated in the past and calculates a larger fairness coefficient with respect to the MNO in which a smaller FH capacity was allocated in the past.

The FH capacity allocating unit 123 calculates FH capacity allocated to each of the MNOs related to the respective shared RUs 20 (hereinafter, referred to as "allocation capacity") on the basis of the needed capacity and the gain for each MNO in each of the shared RUs 20 notified from the MNO information acquiring unit 121 and on the basis of the fairness coefficient for each MNO calculated by the fairness coefficient calculating unit 122. At this time, the FH capacity allocating unit 123 calculates the allocation capacity for each MNO related to each of the shared RUs 20 such that the allocation capacity is increased in a MNO in which the gain is larger with respect to the needed capacity and such that the allocation capacity is increased in a MNO in which the fairness coefficient is larger. Then, the FH capacity allocating unit 123 notifies the allocation information generating unit 124 of the allocation capacity for each of the shared RUs 20 and for each MNO.

The allocation information generating unit 124 generates allocation information indicating the allocation capacity for each of the shared RUs 20 and each of the MNOs calculated by the FH capacity allocating unit 123. At this time, the allocation information generating unit 124 includes the information indicating, for each of the shared RUs 20, the allocation capacity allocated to each of the MNOs associated with the respective CU/DUs 200 into the allocation information addressed to the CU/DUs 200 associated with the respective MNOs. The allocation information is output from the input/output unit 110 to the CU/DUs 200 that are associated with the respective MNOs.

The memory 130 includes, for example, a random access memory (RAM), a read only memory (ROM), or the like and stores therein information that is used to be processed by the processor 120.

Figure 3:
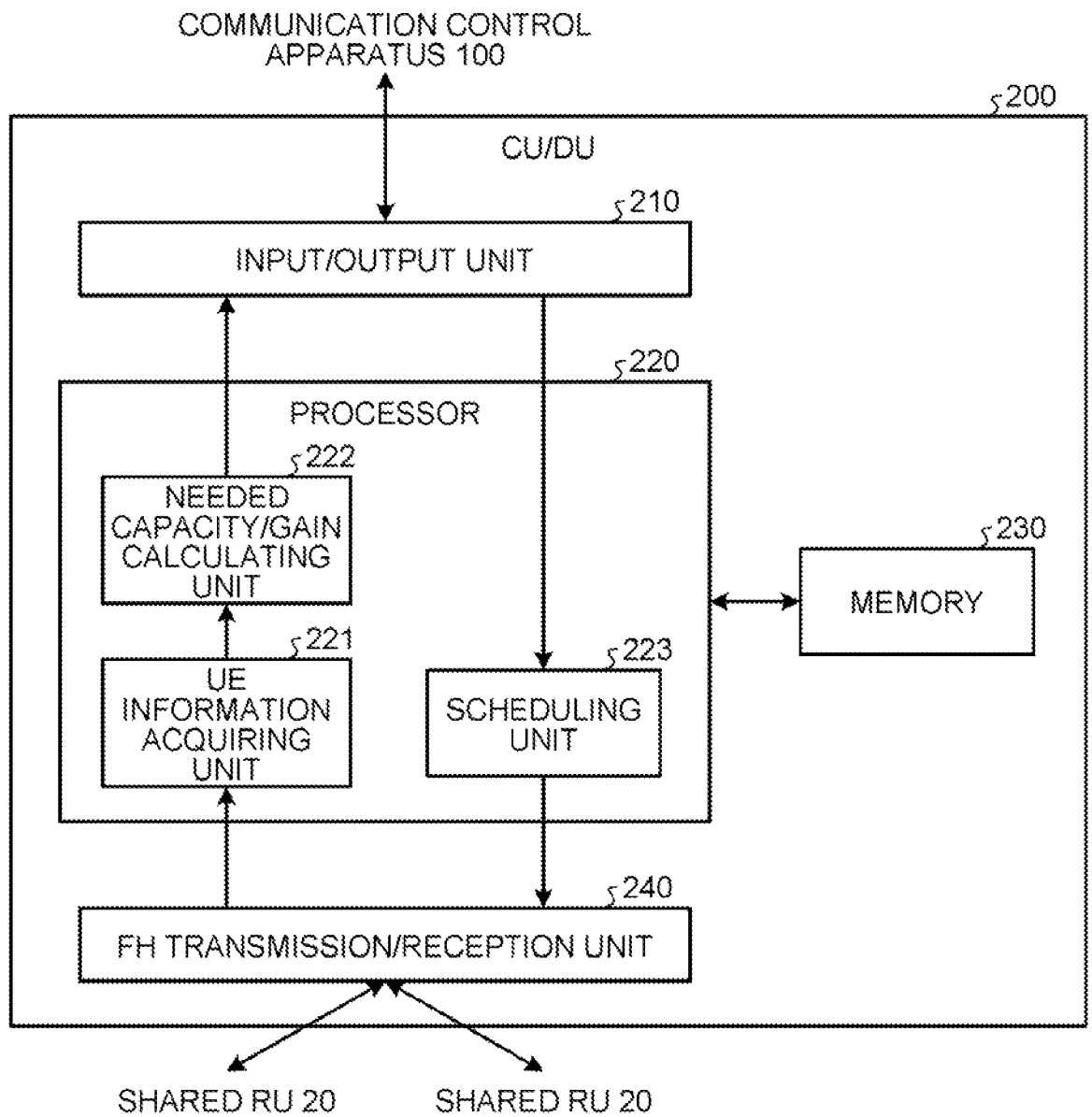
FIG. 3 is a block diagram illustrating a configuration of a CU/DU according to the first embodiment.

FIG. 3 is a block diagram illustrating a configuration of the CU/DU 200 according to the first embodiment. The CU/DU 200 illustrated in FIG. 3 includes an input/output unit 210, a processor 220, a memory 230, and a FH transmission/reception unit 240.

The input/output unit 210 connects to the communication control apparatus 100, outputs information to the communication control apparatus 100, and receives an input of the information from the communication control apparatus 100. Specifically, the input/output unit 210 receives an input of allocation information that indicates the allocation capacity of the own MNO for each of the shared RUs 20. Furthermore, the input/output unit 210 outputs the MNO information that indicates the needed capacity and the gain of the own MNO in each of the shared RUs 20.

The processor 220 includes, for example, a CPU, a FPGA, a DSP, or the like and performs overall control of the CU/DU 200. Specifically, the processor 220 includes a UE information acquiring unit 221, a needed capacity/gain calculating unit 222, and a scheduling unit 223.

The UE information acquiring unit 221 acquires information on the UE 30 that performs wireless communication with the plurality of shared RUs 20 connected to the CU/DUs 200. Specifically, the UE information acquiring unit 221 acquires, for each of the UEs 30, a traffic amount of data transmitted or received, a communication rate that varies in accordance with a radio environment, and identification information on the shared RU 20 disposed at the connection destination in which wireless communication is performed. The UE information acquiring unit 221 accumulates the acquired UE information.

FIG. 4 is a diagram illustrating a specific example of the UE information accumulated by the UE information acquiring unit 221. As illustrated in FIG. 4, in association with the UE identification information, a generated traffic amount, a unit band communication rate, and connection shared RU identification information are acquired as the UE information.

The UE identification information is identification information that is unique to each of the UEs 30 and that identifies the UE 30. The generated traffic amount indicates a traffic amount that is transmitted from the UE 30 or that is received by the UE 30. The information on the generated traffic amount is obtained as a result of the CU/DU 200 receiving, via the shared RU 20, the information on an amount of transmission and reception data requested by the UE 30. The unit band communication rate indicates a communication rate per unit frequency band of the UE 30. The information on the unit band communication rate is obtained as a result of the CU/DU 200 receiving, via the shared RU 20, the information on the communication rate specified by the modulation and coding scheme (MCS) or the like applied to the UE 30. The connection shared RU identification information is identification information that is unique to each of the shared RUs 20 and that identifies the shared RU 20 with which the UE 30 performs wireless communication.

The example illustrated in FIG. 4 indicates that, for example, the UE 30 with "UE #1" indicated by the UE identification information performs wireless communication with the shared RU 20 with "RU #1" indicated by the connection shared RU identification information, the generated traffic amount is "100 Mbps", and the unit band communication rate is "1.5 bps/Hz".

The UE information acquiring unit 221 acquires and accumulates, from each of the shared RUs 20, the above described UE information related to all of the UEs 30 that are under the jurisdiction of the own MNO.

The needed capacity/gain calculating unit 222 calculates needed capacity and a gain for each of the shared RUs 20 on the basis of the UE information acquired by the UE information acquiring unit 221. Specifically, the needed capacity/gain calculating unit 222 calculates needed capacity c and a gain u, by using Equations (1) and (2) below, from a generated traffic amount $\lambda_j$ and a unit band communication rate $r_j$ for each of the UEs 30.

$$c = \sum_j \lambda_j / r_j \quad (1)$$

$$u = \sum_j \lambda_j \quad (2)$$

Namely, the needed capacity/gain calculating unit 222 calculates, as the needed capacity c, a total radio bandwidth of the UEs 30 obtained by dividing the generated traffic amount $\lambda_j$ by the unit band communication rate $r_j$ and calculates, as the gain u, a total generated traffic amount $\lambda_j$ of the UEs 30. The needed capacity/gain calculating unit 222 calculates the needed capacity c and the gain u of the own MNO related to each of the shared RUs 20, adds the needed capacity c and the gain u for each of the shared RUs 20 to the MNO information on the own MNO, and outputs the MNO information to the communication control apparatus 100 from the input/output unit 210.

The scheduling unit 223 performs scheduling of the FH line for each of the shared RUs 20 in accordance with the allocation information received by the input/output unit 210. Namely, the scheduling unit 223 decides a radio bandwidth and the number of communication streams used in each of the shared RUs 20 on the basis of the allocation capacity to the own MNO for each of the shared RUs 20. Then, the scheduling unit 223 controls transmission and reception performed by the FH transmission/reception unit 240 such that communication using the FH line is performed in accordance with the decided radio bandwidth and the number of communication streams.

The memory 230 includes, for example, a RAM, a ROM, or the like and stores the information that is used for the process performed by the processor 220.

The FH transmission/reception unit 240 transmits and receives data to and from the shared RU 20 via the FH line in accordance with the scheduling indicated by the scheduling unit 223. Namely, the FH transmission/reception unit 240 transmits, to each of the shared RUs 20, data by an amount according to the radio bandwidth and the number of communication streams that are decided by the scheduling unit 223. Furthermore, the FH transmission/reception unit 240 receives, from each of the shared RUs 20, data by an amount according to the radio bandwidth and the number of communication streams that are decided by the scheduling unit 223.

Figure 5:
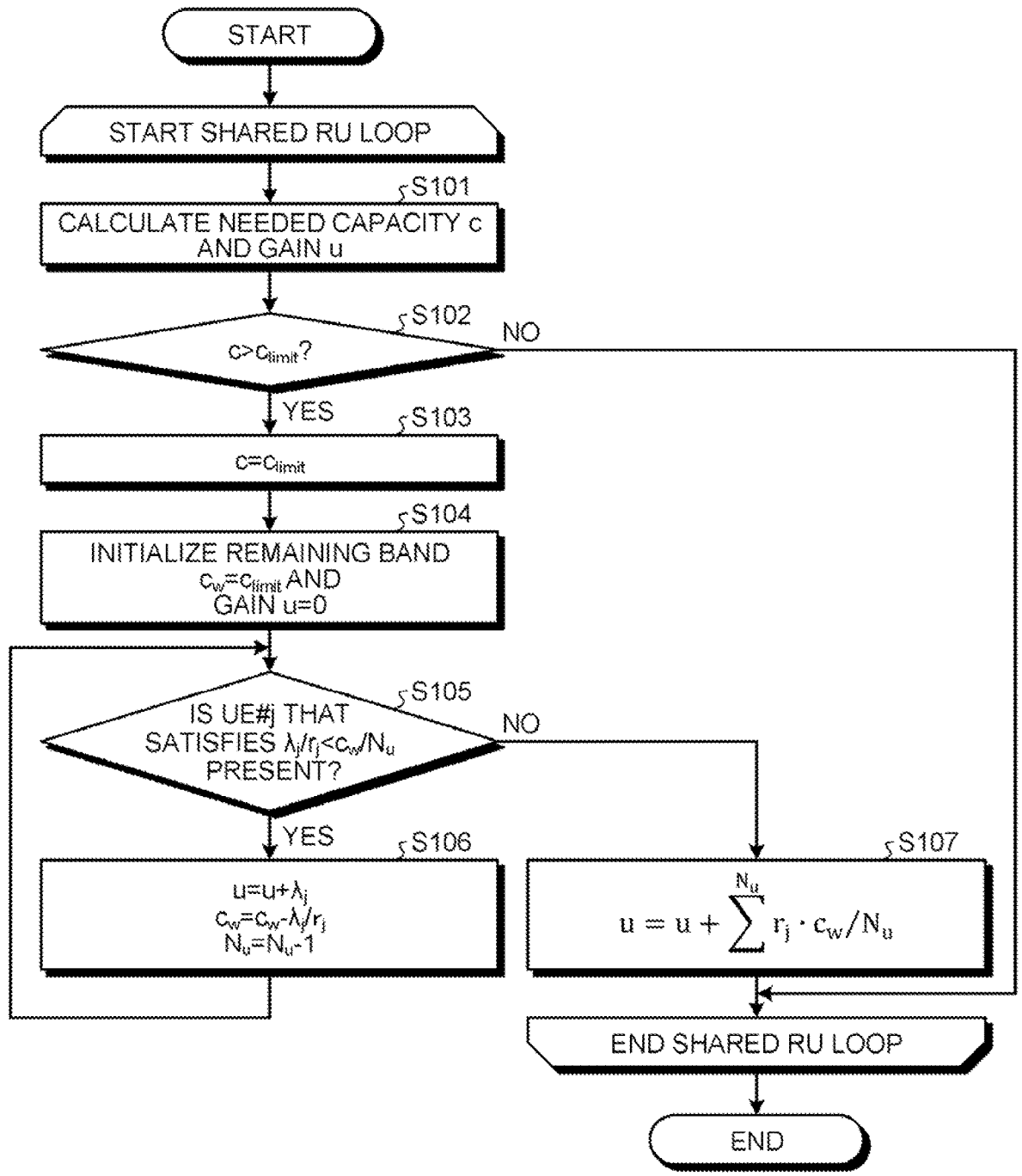
FIG. 5 is a flowchart illustrating a MNO information calculation method.

In the following, a method of calculating MNO information performed by the CU/DU 200 having the configuration described above will be described with reference to the flowchart illustrated in FIG. 5. The CU/DU 200 calculates, by mainly using the needed capacity/gain calculating unit 222, the needed capacity and the gain of the own MNO in each of the shared RUs 20 as MNO information. Therefore, the method of calculating MNO information described below is repeated for each of the shared RUs 20 connected to the CU/DUs 200.

First, the needed capacity c and the gain u of the own MNO in the shared RU 20 is calculated by using Equations (1) and (2) above (Step S101). Namely, a total radio bandwidth of the UEs 30 that perform wireless communication with the shared RUs 20 is calculated as the needed capacity c, and a total generated traffic amount $\lambda_j$ of the UEs 30 is calculated as the gain u. Consequently, the needed capacity and the gain of the own MNO in the shared RU 20 are calculated; however, there is an upper limit to the FH capacity between the CU/DU 200 and the shared RU 20 and, if the needed capacity c exceeds the upper limit of the FH capacity, the needed capacity c results in an unrealized value.

Thus, the needed capacity c is compared to an upper limit $c_{limit}$ of the FH line (Step S102), and, if the needed capacity c does not exceed the upper limit $c_{limit}$ (No at Step S102), the needed capacity c and the gain u of the own MNO in the subject shared RU 20 are determined to be the value calculated at Step S101. In contrast, if the needed capacity c exceeds the upper limit $c_{limit}$ (Yes at Step S102), the needed capacity c and the gain u calculated at Step S101 are adjusted.

Specifically, the needed capacity c related to the subject shared RU 20 is set to the upper limit $c_{limit}$ of the FH line (Step S103), and a remaining band $c_w$ and the initial value of the gain u are set to $c_{limit}$ and 0, respectively, in order to calculate the gain u (Step S104). Then, it is determined whether there is the UE 30 in which the radio bandwidth for each of the UEs 30 obtained by dividing the generated traffic amount $\lambda_j$ by the unit band communication rate $r_j$ is smaller than an equal division band obtained by dividing the remaining band $c_w$ by the number $N_u$ of the UEs 30 that performs wireless communication with the shared RU 20 (Step S105). Namely, it is determined whether there is the UE 30 in which the equal division band ($c_w/N_u$) obtained by equally dividing the radio band that can be allocated to the shared RU 20 into the number of the UEs 30 managed by the own MNO is larger than a needed radio bandwidth ($\lambda_j/r_j$) and in which an excess radio band is generated.

If the result of the determination indicates that the UE 30 in which an excess radio band is generated is not present (No at Step S105), the gain u in the shared RU 20 corresponds to a value obtained by adding the value of the current gain u to a total of the products of the unit band communication rate $r_j$ and the equal division band ($c_w/N_u$) for each of the UEs 30 (Step S107). Here, because the initial value of the gain u is 0, the total of the products of the unit band communication rate and the equal division band of each of the UEs 30 is calculated as the gain u of the shared RU 20.

In contrast, if the UE 30 in which an excess radio band is generated is present (Yes at Step S105), the gain u in the shared RU 20 is updated to a value obtained by adding the value of the current gain u to the generated traffic amount $\lambda_j$ of the UE 30 in which an excess radio band is generated. Furthermore, the remaining band $c_w$ is updated to the value obtained by subtracting the radio bandwidth ($\lambda_j/r_j$) that is actually needed by the UE 30 in which an excess radio band is generated from the value of the current remaining band $c_w$.

Then, in order to exclude the subject UE 30 in the subsequent processes, the number $N_u$ of the UEs 30 is decremented by 1 (Step S106).

In this way, after the UE 30 in which the equal division band obtained by equally dividing the remaining band is larger than the needed radio bandwidth is excluded, it is determined whether the UE 30 in which the equal division band that is obtained by again dividing the remaining band is larger than the needed radio bandwidth is present (Step S105). Then, the UE 30 in which an excess radio band is generated is excluded one by one and, if the UE 30 in which an excess radio band is generated is not present (No at Step S105), the gain u in the shared RU 20 is calculated by adding the value of the current gain u to the gain obtained by equally dividing the remaining band $c_w$ at that time by the number of the remaining UEs 30 (Step S107).

By performing the process described above, the needed capacity c and the gain u of the shared RU 20 is determined within the upper limit of the FH capacity. Calculation of the needed capacity c and the gain u of the shared RU 20 in this way is repeated with respect to all of the shared RUs 20 connected to the CU/DUs 200 and the needed capacity c and the gain u of the own MNO in each of the shared RUs 20 are obtained. Then, the needed capacity c and the gain u of the own MNO are output to the communication control apparatus 100 as the MNO information.

Figure 6:
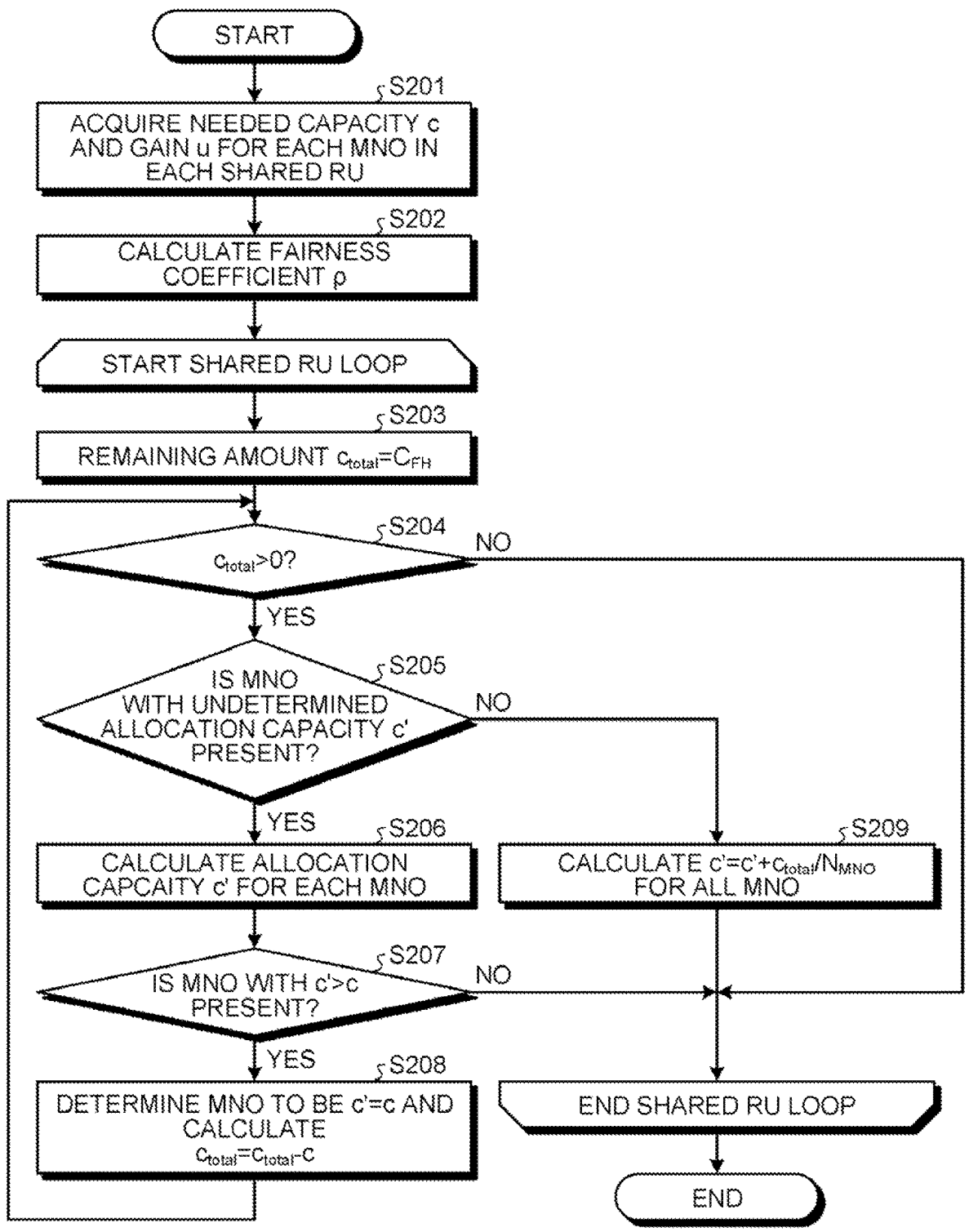
FIG. 6 is a flowchart illustrating a FH capacity allocation method.

In the following, a FH capacity allocation method used in the communication control apparatus 100 will be described with reference to the flowchart illustrated in FIG. 6. As will be described below, the communication control apparatus 100 receives an input of the MNO information on each of the MNOs and decides the FH capacity for each MNO in each of the shared RUs 20 on the basis of the MNO information and the fairness coefficient.

If the MNO information is input from each of the CU/DUs 200 to the input/output unit 110, the needed capacity c and the gain u for each MNO in each of the shared RUs 20 are acquired by the MNO information acquiring unit 121 (Step S201). Furthermore, a fairness coefficient ρ for each MNO is calculated from the allocation track record of the FH capacity with respect to each of the past MNOs by the fairness coefficient calculating unit 122 (Step S202). Specifically, for example, as indicated by Equation (3), a reciprocal of a total of the FH capacity allocated to the MNOs in a past predetermined time period is calculated as the fairness coefficient ρ.

$$\rho = 1 \Big/ \sum^{N_{RU}} \sum^{T} u'_t \tag{3}$$

where, in Equation (3), $N_{RU}$ denotes the number of the shared RUs 20 used by each of the MNOs, T denotes a past predetermined time period, and $u'_t$ denotes a track record gain associated with the FH capacity allocated to the MNOs in the respective shared RUs 20 at time t. The track record gain $u'_t$ is calculated by, for example, Equation (4) below.

$$u'_t = u_t c'_t / c_t \tag{4}$$

Namely, regarding all of the shared RUs 20 used for each MNO, the track record gain $u'_t$ is calculated by multiplying the gain $u_t$ at time t by the ratio of actually allocated FH capacity $c'_t$ to the needed capacity $c_t$. Consequently, regarding the MNO in which the allocated FH capacity is larger, the track record gain $u'_t$ is increased, whereas, regarding the MNO in which the allocated FH capacity is smaller, the track record gain u'$_t$ is decreased. Furthermore, the fairness coefficient ρ is a reciprocal of a total of the track record gain u'$_t$; therefore, the fairness coefficient ρ of the MNO in which larger FH capacity is allocated in a predetermined time period T is decreased, whereas the fairness coefficient ρ of the MNO in which smaller FH capacity is allocated in the predetermined time period T is increased. Furthermore, the track record gain u'$_t$ that is used to calculate the fairness coefficient ρ may be reported from each of the CU/DUs 200 managed by the respective MNOs, instead of being calculated as described above.

In this way, if the needed capacity c, the gain u, and the fairness coefficient ρ for each MNO are obtained, an allocation amount of the FH capacity for each MNO in each of the shared RUs 20 is calculated by the FH capacity allocating unit 123. Namely, the allocation method of the FH capacity with respect to each of the MNOs described below is repeated for each of the shared RUs 20.

First, the initial value of the remaining capacity c$_{total}$ of the FH capacity in the shared RU 20 is set to total FH capacity C$_{FH}$ of the subject shared RU 20 (Step S203). Then, it is judged whether the remaining capacity c$_{total}$ is larger than or equal to 0 (Step S204), and, if the remaining capacity c$_{total}$ is 0 (No at Step S204), allocation of the FH capacity related to the subject shared RU 20 is completed. Here, because the remaining capacity c$_{total}$ is the initial value C$_{FH}$ and is larger than 0 (Yes at Step S204), it is judged whether there is a MNO in which allocation capacity c' has not been determined (Step S205). Then, the allocation capacity c' has not been determined for any of the MNO (Yes at Step S205), so that the allocation capacity c' for each MNO is calculated (Step S206).

Specifically, the FH capacity (the allocation capacity c') for each MNO in the shared RU 20 is calculated by Equation (5) below.

$$c' = c_{total} \cdot \rho \cdot \frac{u}{c} / \sum \left( \rho \cdot \frac{u}{c} \right) \qquad (5)$$

Namely, the allocation capacity c' for each MNO is calculated by multiplying the remaining capacity c$_{total}$ by the proportion of the product of the fairness coefficient ρ and the ratio of the gain u to the needed capacity c for each MNO occupied by a total product of the fairness coefficient ρ and the ratio of the gain u to the needed capacity c for all MNOs. Consequently, the allocation capacity c' is increased in the MNO in which the fairness coefficient ρ is larger, whereas the allocation capacity c' is decreased in the MNO in which the fairness coefficient ρ is smaller. Furthermore, the allocation capacity c' is increased in the MNO in which the gain u with respect to the needed capacity c is larger, whereas the allocation capacity c' is decreased in the MNO in which the gain u with respect to the needed capacity c is smaller. Consequently, it is possible to guarantee the fairness of the plurality of MNOs in terms of allocation of the FH capacity, and it is possible to allocate the FH capacity by giving a priority to the MNO that efficiently uses the FH capacity.

However, the allocation capacity c' calculated by using Equation (5) above may possibly exceed the needed capacity c requested by each of the MNOs. Namely, excess FH capacity may sometimes be generated caused by FH capacity being excessively allocated to some MNO. Accordingly, allocation capacity c' and the needed capacity c of each of the MNOs are compared by the FH capacity allocating unit 123 (Step S207). Then, if the allocation capacity c' does not exceed the needed capacity c in any of the MNOs (No at Step S207), the allocation capacity c' of each of the MNOs in the subject shared RU 20 is determined. In contrast, if the allocation capacity c' exceeds the needed capacity c in any one of the MNOs (Yes at Step S207), the allocation capacity c' for the subject MNO is determined to be the value corresponding to the needed capacity c, and the determined needed capacity c is subtracted from the remaining capacity c$_{total}$ (Step S208).

Then, it is judged whether the new remaining capacity c$_{total}$ is larger than or equal to 0 (Step S204), the processes described above are repeated. If the remaining capacity c$_{total}$ becomes 0 (No at Step S204), the entire FH capacity of the subject shared RU 20 is distributed to each of the MNOs, so that the allocation capacity c' of each of the MNOs is determined. Furthermore, if the remaining capacity c$_{total}$ is larger than or equal to 0 and the allocation band c' for all of the MNOs has already been determined to be the value corresponding to the needed capacity c (No at Step S205), the remaining capacity c$_{total}$ is equally divided for each of the MNOs and the obtained value is added to the allocation band c' (Step S209). Consequently, the entire FH capacity of the subject shared RU 20 is distributed to the MNO without excess or deficiency, and it is thus efficiently allocate the FH capacity to the plurality of MNOs.

By performing the processes described above, the allocation capacity c' of each of the MNOs in the shared RU 20 is determined. The calculation of the allocation capacity c' for each MNO in the shared RUs 20 performed in this way is repeated for all of the shared RU 20, and the allocation capacity c' of each of the MNOs in the respective shared RUs 20 is obtained. The allocation capacity c' for each MNO in the associated shared RUs 20 is notified to the allocation information generating unit 124.

Then, the allocation information that indicates the allocation capacity c' for each MNO is generated for each of the shared RUs 20 by the allocation information generating unit 124 and the allocation information is output from the input/output unit 110 to the CU/DU 200 that is associated with each of the MNOs. Then, the scheduling according to the allocation information is performed by the scheduling unit 223 included in the CU/DU 200, so that it is possible to transmit and receive data by efficiently using the FH capacity of each of the shared RUs 20.

As described above, according to the embodiment, the fairness coefficient is obtained from the allocation track record of the FH capacity allocated to the MNO, and the FH capacity of each of the shared RUs is distributed to the plurality of MNOs on the basis of the fairness coefficient, the needed capacity, and the gain for each MNO. Consequently, it is possible to guarantee the fairness of the plurality of MNOs at the time of allocating the FH capacity, and it is possible to allocate the FH capacity by giving a priority to the MNO that efficiently uses the FH capacity. Namely, it is possible to fairly and efficiently allocate the FH capacity to the plurality of MNOs.

[b] Second Embodiment

The characteristic of a second embodiment is that, instead of sharing the entire FH capacity of each of the shared RUs by the plurality of MNOs, a sharing rate that indicates a proportion of the FH capacity shared by the plurality of MNOs is decided for each shared RU.

Figure 7:
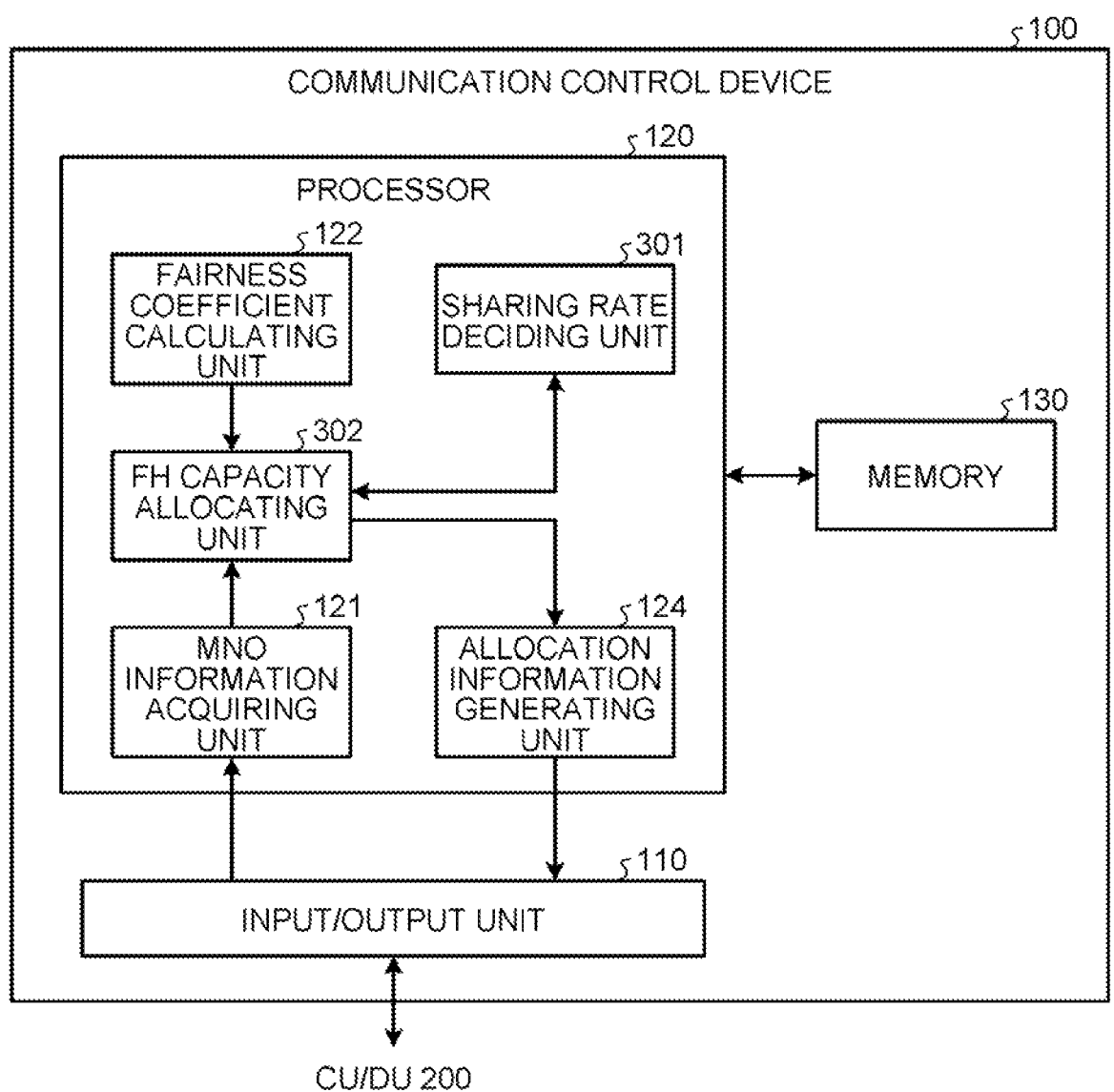
FIG. 7 is a block diagram illustrating a configuration of a communication control apparatus according to a second embodiment.

A configuration of a wireless communication system according to the second embodiment is the same as that described in the first embodiment (FIG. 1); therefore, descriptions thereof will be omitted. FIG. 7 is a block diagram illustrating the configuration of the communication control apparatus 100 according to the second embodiment. In FIG. 7, components that are the same as those illustrated in FIG. 2 are assigned the same reference numerals and descriptions thereof will be omitted. The communication control apparatus 100 illustrated in FIG. 7 has a configuration in which a sharing rate deciding unit 301 is added to the communication control apparatus 100 illustrated in FIG. 2 and a FH capacity allocating unit 302 is included instead of the FH capacity allocating unit 123.

The sharing rate deciding unit 301 decides, regarding each of the shared RUs 20 in a predetermined period, a sharing rate that indicates a proportion of the FH capacity shared by the plurality of MNOs. Specifically, the sharing rate deciding unit 301 calculates, from the gain obtained in a case where the entire FH capacity of the shared RU 20 is equally divided into the plurality of MNOs, an amount of gain improvement of the gain obtained in a case where the entire FH capacity of the shared RU 20 is distributed in the same manner as that described above in the first embodiment. Then, the sharing rate deciding unit 301 decides a sharing rate in each of the shared RUs 20 on the basis of an amount of gain improvement and a fluctuation situation of the needed capacity of each of the MNOs in a period of time between the decision time of the sharing rate last time and the decision time of the sharing rate this time.

The FH capacity allocating unit 302 calculates allocation capacity for each MNO related to each of the shared RUs 20 on the basis of the needed capacity and the gain for each MNO in each of the shared RUs 20 notified from the MNO information acquiring unit 121, the fairness coefficient for each MNO calculated by the fairness coefficient calculating unit 122, and the sharing rate calculated by the sharing rate deciding unit 301. Namely, the FH capacity allocating unit 302 distributes the shared FH capacity obtained by multiplying the sharing rate by the FH capacity of each of the shared RUs 20 to the plurality of MNOs on the basis of the fairness coefficient, the needed capacity, and the gain.

At this time, the FH capacity allocating unit 302 calculates the allocation capacity for each MNO related to each of the shared RUs 20 such that the allocation capacity is increased in the MNO in which the gain is larger with respect to the needed capacity and the allocation capacity is increased in the MNO in which the fairness coefficient is larger. Furthermore, the FH capacity allocating unit 302 allocates the remaining unshared FH capacity to the plurality of MNOs by equally dividing the remaining unshared FH capacity. Then, the FH capacity allocating unit 302 notifies the allocation information generating unit 124 of the allocation capacity for each shared RU 20 and for each MNO.

Figure 8:
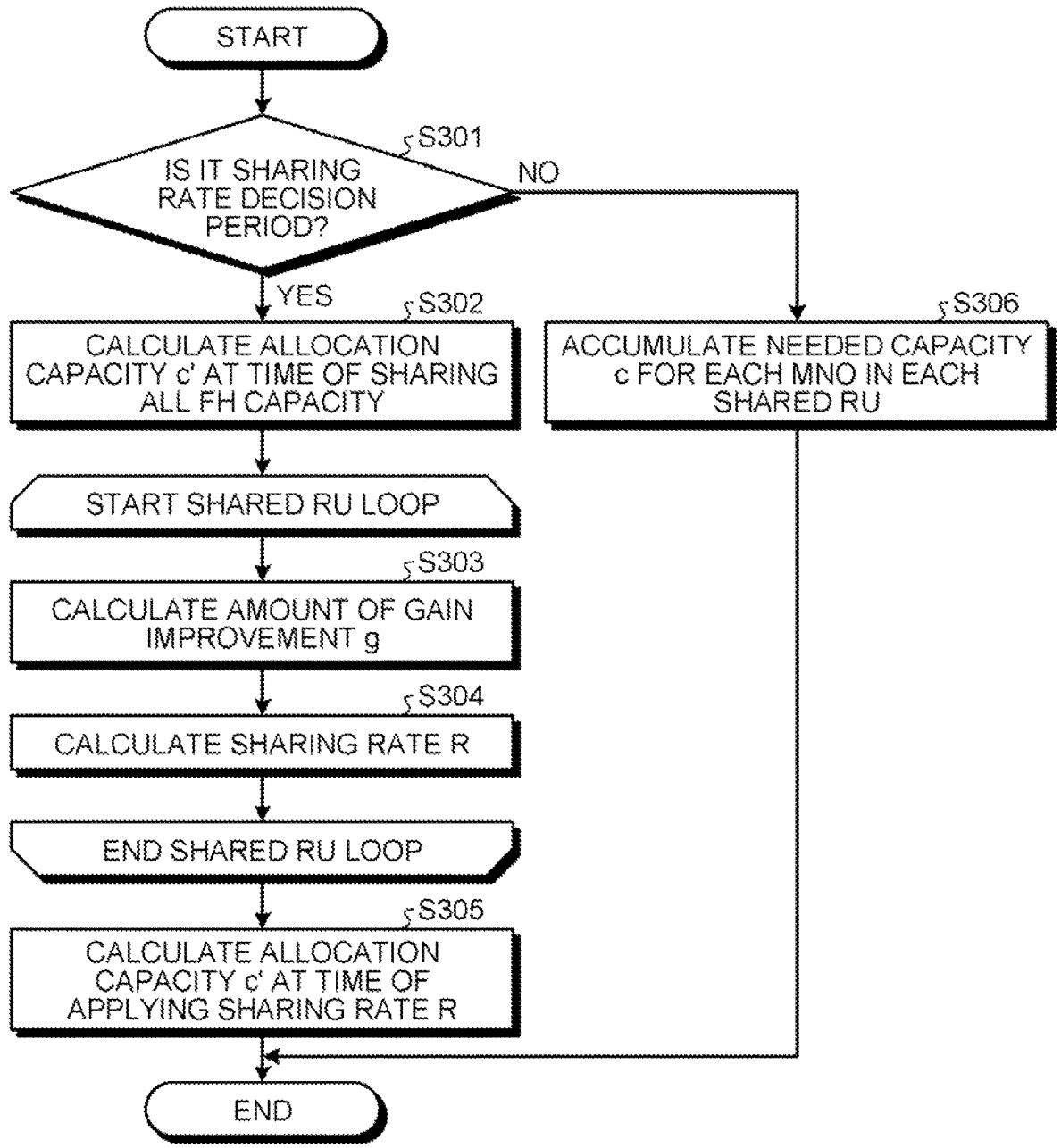
FIG. 8 is a flowchart illustrating a sharing rate calculation method.

In the following, a sharing rate calculation method used in the communication control apparatus 100 having the above described configuration will be described with reference to the flowchart illustrated in FIG. 8. The calculation of the sharing rate described below is mainly performed by the sharing rate deciding unit 301 and the FH capacity allocating unit 302.

The sharing rate deciding unit 301 determines whether it is a predetermined period for which the sharing rate is to be decided (Step S301), and if it is not the period (No at Step S301), the needed capacity c included in the MNO information received from each of the CU/DUs 200 is accumulated (Step S306).

Then, if it is the period for which the sharing rate is to be decided (Yes at Step S301), the allocation capacity c' for each of the shared RUs 20 and for each of the MNOs in a case where the entire FH capacity of each of the shared RUs 20 is calculated by the FH capacity allocating unit 302 (Step S302). The calculation of the allocation capacity c' performed at this time is performed in the same manner as that described above in the first embodiment described above. Then, if the allocation capacity c' for each MNO is calculated for all of the shared RUs 20, the following processes for obtaining the sharing rate for each of the shared RUs 20 are repeated by the sharing rate deciding unit 301.

First, an amount of gain improvement g with respect to the gain in a case where the entire FH capacity is distributed in the same manner as that described above in the first embodiment is calculated from the gain in a case where the entire FH capacity is equally divided into the plurality of MNOs (Step S303). Specifically, the amount of gain improvement g is calculated by using Equation (6) below.

$$g=(U_m-U_{m,ave})/U_{m,ave} \quad (6)$$

where, in Equation (6), $U_m$ denotes a gain in the case of distributing the entire FH capacity in the same manner as that described above in the first embodiment, and $U_{m,ave}$ denotes a gain in the case of equally dividing the entire FH capacity into the plurality of MNOs, each of which is obtained by Equation below.

$$U_m = \sum^{N_{MNO}} \frac{u \cdot c'}{c}$$

$$U_{m,ave} = \sum^{N_{MNO}} \frac{u \cdot C_{FH}/N_{MNO}}{c}$$

Then, a sharing rate R is calculated on the basis of the amount of gain improvement g by Equation (7) below (Step S304).

$$R=\alpha \cdot g/\sigma \quad (7)$$

where, $\alpha$ denotes a predetermined coefficient for adjusting the sharing rate, $\sigma$ denotes a normalized standard deviation of the needed capacity c for each MNO obtained after the decision of the last sharing rate that is calculated by using Equation (8) below.

$$\sigma = \sum^{N_{MNO}} \frac{\sigma_i/c_{pre,i}}{N_{MNO}} \quad (8)$$

In Equation (8), $\sigma_i$ denotes normalized standard deviation of the needed capacity c of the $i^{th}$ MNO obtained after the decision of the last sharing rate, and $C_{pre,i}$ denotes the needed capacity of the $i^{th}$ MNO obtained at the time of deciding the last sharing rate. The calculation for obtaining the sharing rate R is performed by using the needed capacity c accumulated in a period of time before the arrival of the period at which the sharing rate R is decided.

In Equation (8) above, because $\sigma_i$ indicates the fluctuation situation of the needed capacity c of the $i^{th}$ MNO, $\sigma$ indicates the fluctuation situation of the average of the needed capacity c of all of the MNOs. Furthermore, as can be seen from Equation (7), the sharing rate R is increased as an amount of gain improvement g is larger and a fluctuation range of the needed capacity c is smaller. Therefore, the improvement of the gain is increased by dynamically allocating the FH capacity to each of the MNOs, a larger amount of FH capacity is shared at the time of small fluctuation in the needed capacity within a period for which allocation of the FH capacity is to be decided, and it is thus possible to further improve communication efficiency.

The sharing rate R in the shared RU 20 is decided on the basis of the calculation described above. The decision of the sharing rate R of the shared RU 20 performed in this way is repeated for all of the shared RUs 20 and the sharing rate R in each of the shared RUs 20 is decided. Then, the sharing rate R for each of the shared RUs 20 is notified to the FH capacity allocating unit 302, and the allocation capacity c' for each MNO in the case of applying the sharing rate R to each of the shared RUs 20 is calculated by the FH capacity allocating unit 302 (Step S305). The calculation of the allocation capacity c' is performed by using the same method as that described above in the first embodiment (FIG. 6), and the initial value of the remaining capacity $c_{total}$ corresponds to the shared FH capacity that is obtained by multiplying the sharing rate R by the entire FH capacity $C_{FH}$ of the shared RU 20. Furthermore, the remaining FH capacity that does not corresponds to the shared FH capacity is equally divided and allocated to each of the MNOs.

As described above, according to the embodiment, the sharing rate of the FH capacity of the shared RU is decided on the basis of the amount of gain improvement and the fluctuation situation of the needed capacity, and then, the shared FH capacity to which the decided sharing rate is applied is distributed to each of the MNOs. Consequently, for example, if the needed capacity is greatly fluctuated and appropriate allocation capacity is changed after the FH capacity is dynamically allocated, it is possible to prevent a decrease in communication efficiency by reducing the shared FH capacity. In other words, if a state in which the gain is improved by dynamically allocating the FH capacity is continued, it is possible to further improve the communication efficiency by increasing the shared FH capacity.

Furthermore, in each of the embodiments described above, it is assumed that the needed capacity and the gain for each MNO are calculated in the CU/DU 200; however, the needed capacity and the gain for each MNO may be calculated in the communication control apparatus 100. Namely, the needed capacity c and the gain u may be calculated by outputting the UE information managed by each of the MNOs acquired by the UE information acquiring unit 221 included in each of the CU/DUs 200 to the communication control apparatus 100 and performing, in the communication control apparatus 100, the same calculation as that performed by the needed capacity/gain calculating unit 222.

According to an aspect of an embodiment of the communication control apparatus and the communication control method disclosed in the present application, an advantage is provided in that it is possible to fairly and efficiently allocate FH capacity to a plurality of MNOs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control apparatus that allocates capacity of a line that connects a plurality of baseband units managed by a plurality of operators to a radio unit shared by the plurality of operators to the plurality of operators, the communication control apparatus comprising:

a memory; and
a processor coupled to the memory, wherein
the processor executes a process including:
calculating a fairness coefficient indicating allocation fairness of the line with respect to each of the plurality of operators;
acquiring needed capacity of the line needed by each of the plurality of operators and a gain achievable when the needed capacity is allocated to each of the plurality of operators; and
deciding allocation capacity of the line for each operator based on the fairness coefficient, the needed capacity, and the gain.

2. The communication control apparatus according to claim 1, wherein the calculating includes calculating, as the fairness coefficient for each operator, a reciprocal of a total value of values corresponding to the allocation capacity for each operator allocated in a past predetermined time period.

3. The communication control apparatus according to claim 1, wherein the acquiring includes acquiring, as the needed capacity, a total radio bandwidth obtained by dividing an amount of traffic transmitted by wireless communication between the radio unit and a terminal device by a communication rate per unit of a radio frequency band.

4. The communication control apparatus according to claim 1, wherein the acquiring includes acquiring, as the gain, a total amount of traffic transmitted by wireless communication between the radio unit and a terminal device.

5. The communication control apparatus according to claim 1, wherein the deciding includes allocating larger allocation capacity to an operator for which the fairness coefficient is smaller and past allocation capacity is smaller.

6. The communication control apparatus according to claim 1, wherein the deciding includes allocating larger allocation capacity to an operator for which the gain with respect to the needed capacity is larger.

7. The communication control apparatus according to claim 1, wherein, when an operator in which the allocation capacity is larger than the needed capacity is present, the deciding includes setting the allocation capacity of the operator to a value equal to the needed capacity and allocating excess capacity to the other operators by equally dividing the excess capacity.

8. The communication control apparatus according to claim 1, wherein
the process further includes deciding a sharing rate indicating a proportion of capacity dynamically allocated to the plurality of operators to the capacity of the line, and
the deciding of the allocation capacity includes deciding, regarding capacity in which the sharing rate is applied to the capacity of the line, allocation capacity of the line for each operator.

9. A communication control method for allocating capacity of a line that connects a plurality of baseband units managed by a plurality of operators to a radio unit shared by the plurality of operators to the plurality of operators, the communication control method comprising:
calculating a fairness coefficient indicating allocation fairness of the line with respect to each of the plurality of operators;
acquiring needed capacity of the line needed by each of the plurality of operators and a gain achievable when the needed capacity is allocated to each of the plurality of operators; and deciding allocation capacity of the line for each operator based on the fairness coefficient, the needed capacity, and the gain.

* * * * *